United States Patent
Eckardt et al.

(10) Patent No.: US 6,822,408 B2
(45) Date of Patent: Nov. 23, 2004

(54) METHOD OF SECURING A MACHINE ELEMENT AND/OR A LOAD CONNECTED TO THE MACHINE ELEMENT IN A FIXED POSITION

(75) Inventors: Dieter Eckardt, Herzogenaurach (DE); Ronald Hauf, Möhrendorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/353,817

(22) Filed: Jan. 29, 2003

(65) Prior Publication Data

US 2003/0160584 A1 Aug. 28, 2003

(30) Foreign Application Priority Data

Jan. 29, 2002 (DE) .......................................... 102 03 375

(51) Int. Cl.⁷ .................................................. H02P 7/00
(52) U.S. Cl. ........................ 318/265; 318/362; 318/371; 318/275
(58) Field of Search ................................ 318/265, 266, 318/275, 362, 371, 273, 258

(56) References Cited

U.S. PATENT DOCUMENTS

| | | | | |
|---|---|---|---|---|
| 3,579,066 A | * | 5/1971 | Bearfield et al. | 318/372 |
| 3,735,221 A | * | 5/1973 | Bell et al. | 318/151 |
| 3,741,348 A | * | 6/1973 | Caputo | 187/284 |
| 4,477,751 A | * | 10/1984 | Kanayama | 318/280 |
| 5,049,793 A | | 9/1991 | Tanaka et al. | 318/436 |
| 5,747,954 A | * | 5/1998 | Jones et al. | 318/266 |
| 6,097,165 A | | 8/2000 | Herron | |

OTHER PUBLICATIONS

Motion Control, Jan. 2000, Siemens AG, Bereich Automatisierung- und Antriebstechnik, p. 7.

* cited by examiner

*Primary Examiner*—Rina Duda
(74) *Attorney, Agent, or Firm*—Henry M. Feiereisen

(57) ABSTRACT

In a method of holding a machine element, whose position is directly or indirectly controlled by an electromotive drive in the absence of a self-locking mechanism, the drive is halted and a brake is activated to maintain the machine element in a holding position, without shutting down the drive which remain active. The drive is thus a safe drive constructed to securely prevent a re-starting although an inadvertent shutdown is not preventable.

3 Claims, 1 Drawing Sheet

METHOD OF SECURING A MACHINE ELEMENT AND/OR A LOAD CONNECTED TO THE MACHINE ELEMENT IN A FIXED POSITION

CROSS-REFERENCES TO RELATED APPLICATIONS

This application claims the priority of German Patent Application, Serial No. 102 03 375.7, filed Jan. 29, 2002, pursuant to 35 U.S.C. 119(a)–(d), the disclosure of which is incorporated herein by reference.

BACKGROUND OF THE INVENTION

The present invention relates to a method of securing a machine element and/or a load connected to the machine element in a fixed position.

Machine elements involved here do not have a self-locking feature and are operatively connected to an electromotive drive by which the position of the machine element is controlled directly or indirectly. A mechanical holding brake is provided to halt the machine element and/or the load.

Safety measures play an increasingly important role in conjunction with the operation of power machines. Therefore, the European Community established respective standards in 1995, as did the United States and Japan which set equivalent requirements as a consequence of e.g. domestic product liability acts. Safety issues are thus a primary focus of the industrial world market fueling a need for devices and functions that take into account safety requirements. In the field of numeric controls, the safety concept "SINUMERIK SAFETY INTEGRATED®" is predominantly utilized at the present time and is easily applicable also in other fields, e.g. product machines.

Another safety aspect increasingly relevant in industrial plants relates to the field of drives whose axles, shafts or other mechanics are not self-locking when the drive is switched off. In these situations there is a risk of a crash as a result of gravitational forces. Such hazardous movement can develop, for example, when vertical linear axles, in particular suspended axles, or round axles or spindles with asymmetric weight distribution, are involved. Thus, safety concerns demand proper measures to secure such axles or mechanisms in position.

One approach to address these safety concerns involves the use of a continuously active system that mechanically balances the weight. This approach is, however, complicated. Other exceptional cases involve a halting through use of socket pins, underpinning or supports. However, this proposal are targeted only for particular situations, such as reconstructions and start-up. When repeated operative activations are involved, the use of a holding brake or service brake still remains the only option.

Heretofore, a secure hold is realized by halting the electromotive drive which is determinative for the position of the machine element and/or associated load, actuating a mechanical brake to effect a relatively secure hold through frictional engagement, and subsequently switching off the drive. Despite the possibility to perform a constant check of such a brake for proper operation, this approach does not constitute a fool-proof system. While electronic concepts are indeed available to test a secure activation of the brake and it is also possible to test the friction moment in the holding mode, there is still a risk that sudden mishaps, e.g., a completely unexpected oil presence, may cause an abrupt decrease of the braking force. Operators of power machines are aware of this danger for a long time and it has therefore been proposed to use not one but several brakes to meet heightened safety demands during the holding mode. This proposal is, however, very complicated.

It would therefore be desirable and advantageous to provide an improved method for securing a machine element and/or load in a fixed position, to obviate prior art shortcomings and to attain a high degree of safety for holding the machine element and/or load in place.

SUMMARY OF THE INVENTION

According to one aspect of the present invention, a method of securing in a fixed position a machine element whose position is directly or indirectly controlled by an electromotive drive in the absence of a self-locking mechanism, includes the steps of halting the drive and activating a brake to maintain the machine element in a holding position, and maintaining the drive in an active mode to maintain the holding position, whereby the drive is a safe drive constructed to securely prevent a re-starting although an inadvertent shutdown is not preventable.

Heretofore, conventional wisdom required a shutdown of the drive in the holding position as the only option because of the consideration that an inadvertent re-starting of the drive poses a threat to the holding system. The present invention now recognizes that such an inadvertent starting can be safely prevented by suitable measures to establish a "secure drive" so that this conventionally perceived threat is no longer an issue. Thus, the drive can be surprisingly used as redundant, electrical holding system which is completely independent from the mechanical brake.

According to another feature of the present invention, control parameters can be so adapted that positional changes of the holding position below a predetermined threshold are tolerated by a controller. In this way, a very good adaptation to the stationary operation is ensured.

According to another feature of the present invention, the control parameter can be varied in a stabilizing manner in the holding position. Thus, the risk of excitation of undesired vibrations is minimized.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
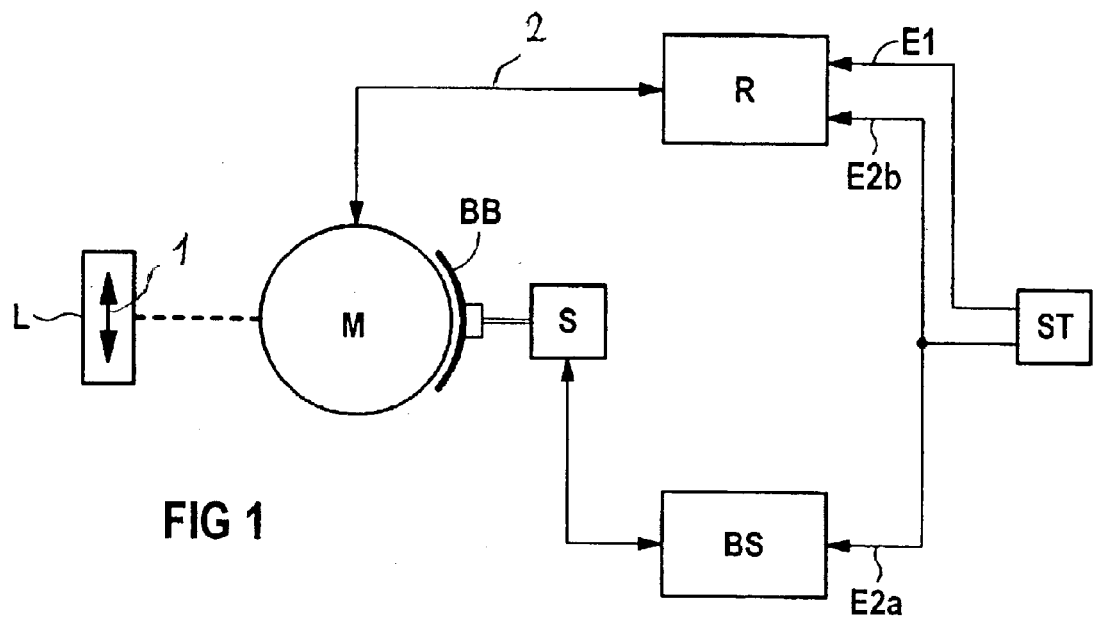
FIG. 1 is a block diagram showing the relationship and operation of the components of an arrangement according to the present invention for securing a component such as a machine element and/or load in a fixed position.

Throughout all the Figures, same or corresponding elements are generally indicated by same reference numerals.

These depicted embodiments are to be understood as illustrative of the invention and not as limiting in any way.

This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "Method of Securing a Machine Element and/or a Load Connected to the Machine Element in a Fixed Position".

Turning now to the drawing, and in particular to FIG. 1, there is shown a block diagram showing the relationship and operation of the components of an arrangement according to the present invention for securing a component, here by way of example a load L, in a fixed position. The arrangement includes a drive, comprised of a motor M and a controller R, for moving the load L via a gear mechanism as indicated by broken line, in two directions, as indicated by double arrow 1.

A control unit ST delivers desired values representative of a movement of the load to an input E1 of the controller R which generates electric control signals for transmission to the motor M. At the same time, the motor M feeds back to the controller R position signals and/or movement signals in response to the actual position and/or actual movement of the load L. This interaction between the motor M and the controller R is indicated by double arrow 2. Depending on the desired values delivered by the control unit ST to the controller R, it is possible to lift or lower the load L in vertical direction in a desired manner.

In the event, the load L should be safely held in a predetermined position, a corresponding desired position value is delivered by the control unit ST to the input El of the controller R so as to position the load L accordingly. When the load L has reached this position, a signal flow from the motor M or the controller R is communicated to the control unit ST. This signal flow is not shown in FIG. 1 for ease of illustration. The control unit ST activates a brake control system BS by sending a signal to an input E2a for mechanically braking the motor M via a coil arrangement S and brake shoe BB.

In accordance with the present invention, the motor M is, however, not completely switched off in the holding position of the load, provided the drive represents overall a safe drive, i.e. electronic measures are provided that safeguard the motor M against inadvertent positional changes. Hereby, the controller R receives information via an input E2b to carry out a permanent position control of the holding position. The control parameter of the controller R can be so adapted that positional changes below a predetermined threshold are tolerated and may be varied to have a stabilizing effect as the need for a highly dynamic control is not necessary. Excitation of undesired vibrations can thus be eliminated.

In accordance with the present invention, the load L is held in safe holding position by two completely independent and separate systems, namely the brake system, on the one hand, and the electric position control system, on the other hand.

Figure 2:
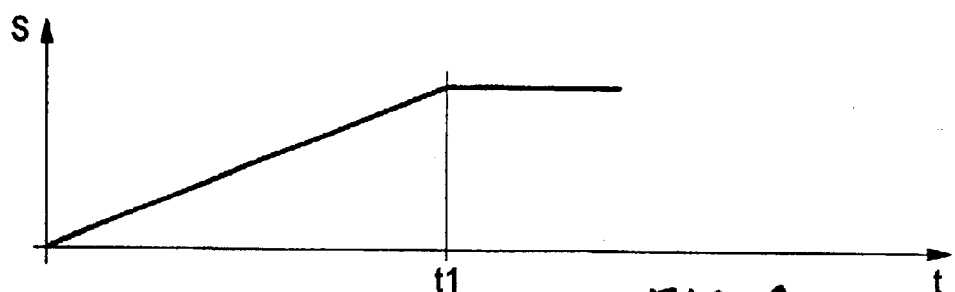
FIG. 2 is a graphical illustration of a time-path diagram showing the relation between path and time of a load during travel and reaching a holding position.
Figure 2A:
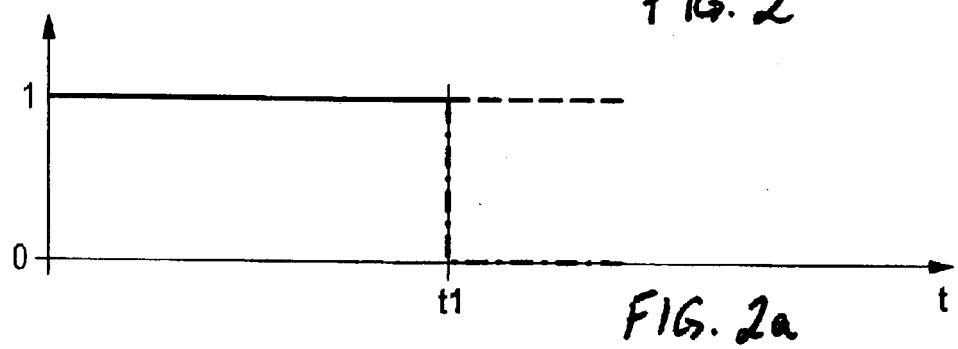
FIG. 2a is a graphical illustration of the operation of the drive after the load reaches the holding position.
Figure 2B:
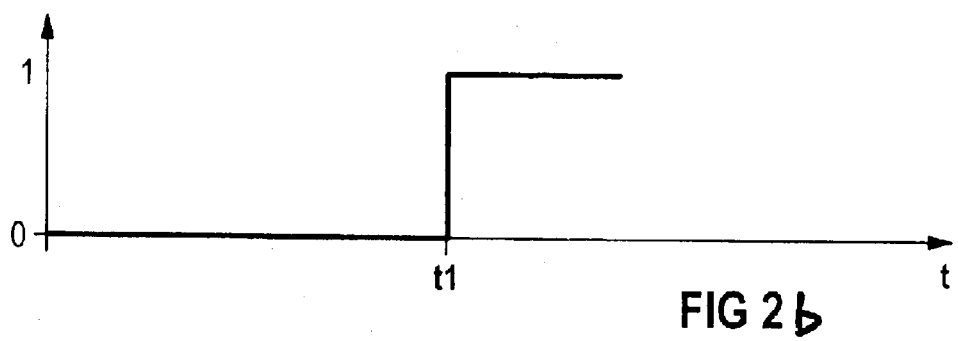
FIG. 2b is a graphical illustration of the situation, when the brake is activated.

The position control system of the motor M is also shown in the graphical illustrations of FIGS. 2, 2a, 2b. FIG. 2 is a graphical illustration of a time-path diagram showing the relation between path and time of the load L during travel and reaching a holding position, whereas FIGS. 2a, 2b show contemporaneous illustrations relating to an active switching state, symbolized by logic "1", and inactive switching state, symbolized by logic "0", of the electric braking action (FIG. 2a) and the mechanical braking action (FIG. 2b). As shown in FIG. 2, the load L travels along a path s up to a point in time t1 when the load L should be held in place. At this point in time t1, the path s remains unchanged, as indicated by the horizontal line.

The electromotive drive is active (logic "1") up to the point in time t1, as shown in FIG. 2a. The continuous line up to point in time t1 indicates the typical control mode. From the point in time t1 on, the drive is kept active, whereby the control parameters are varied, as described above, and indicated by broken line in FIG. 2a. The dashdot line relates, by comparison, to the conventional process in which the electromotive drive would be completely deactivated as of the point in time t1.

FIG. 2b shows the operation of the brake control system BS which is inactive (logic "0") up to the point in time t1, and then activated and switched to logic "1". The activation of the mechanical brake at point in time t1 is a conventional step that is also performed by the method according to the present invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method of holding a machine element, whose position is directly or indirectly controlled by an electromotive drive in the absence of a self-locking mechanism, said method comprising the steps of:

halting the drive and activating a brake to maintain the machine element in a holding position; and maintaining the drive in an active mode to maintain the holding position independently on an operation of the brake and even upon operational failure of the brake, whereby the drive is a safe drive constructed to securely prevent a re-starting although an inadvertent shutdown is not preventable.

2. The method of claim 1, wherein control parameters are so adapted that positional changes of the holding position below a predetermined threshold are tolerated by a controller.

3. The method of claim 2, wherein the control parameter are varied in a stabilizing manner in the holding position.

* * * * *